Patented Aug. 13, 1940

2,211,048

UNITED STATES PATENT OFFICE 2,211,048

RUBBERLIKE PRODUCTS AND PROCESS OF MAKING THEM

Fritz Bitterich, Hanover, Germany, assignor to Reichhold Chemicals, Inc., Detroit, Mich., a corporation of Delaware No Drawing. Application April 3, 1936, Serial No. 72,662. In Germany April 3, 1935

6 Claims. (Cl. 260—3)

Attempts have been made to incorporate phenolic resins into rubber, but so far they have been unsuccessful since no homogeneous products have been obtained. A common alcohol soluble phenolic resin may be kneaded by means of a masticator together with rubber, but on heating the blend yields an entirely unhomogeneous useless mass.

Now I have found that valuable uniform masses are obtained when employing phenolic condensation products which are readily soluble in drying oils. The incorporation may be effected by simultaneously kneading the rubber and the phenolic condensation product in a masticator or simply by blending the solutions of masticated rubber and of the condensation product. On heating the blend an entirely homogeneous transparent mass in any case is obtained.

Particularly valuable results are achieved when heat-hardening condensation products of the class mentioned are employed. Such condensation products may be of the liquid, viscous or solid stage and e. g. are described in U. S. Patents 1,800,295, 1,800,296, 1,996,069 and in applications Serial Nos. 643,794, now Patent No. 2,058,797 dated Oct. 27, 1936, 758,502, now Patent No. 2,079,210 dated May 4, 1937, 30,152, now Patent No. 2,123,898 dated July 19, 1938, 43,642, now Patent No. 2,139,081 dated December 6, 1938, 43,987, now Patent No. 2,101,944 dated December 14, 1937, and 44,126, now Patent No. 2,112,022 dated March 22, 1938. Their solubility properties are due to the presence of a sufficient number of aliphatic or, more generally stated, saturated carbon atoms in the phenols from which they are derived. These phenols preferably are compounded with a considerable excess of formaldehyde over the equimolecular quantity by the aid of a strong alkaline catalyst. On heating the blend of rubber and heat hardening condensation product at temperatures surpassing 120° C. or suitably at 160°–180° C. a condensation reaction takes place whereby the mass becomes much harder and tougher.

As stated in general terms such heat hardening condensation products may be produced by the use of a strong alkaline catalyst from (1) a phenol having only two particularly reaction favorable positions in the molecule unoccupied and at least three saturated carbon atoms for each phenolic group, and (2) formaldehyde in excess over the equimolecular quantity. Phenols of this type may be reacted with rubber to produce a homogeneous reaction product, whereas in the case of phenols having less than three saturated carbon atoms for each phenolic group, as in the case for example of cresylic condensation products, such as are disclosed in Novak Patents Nos. 1,785,701 and 1,952,725, it is impossible to secure a homogeneous reaction product with rubber.

Widely varying proportions of the two ingredients may be used. The rubber may form the main constituent, in which case the condensation product acts as improving agent. Higher proportions of the latter lead to masses of hard rubberlike nature. When using the heat hardening condensation product as main constituent, the rubber acts as a plasticizing agent. In any case reaction masses of particular resistance against chemical and physical (mechanical) influences are obtained which are superior to those of the components themselves.

My invention is, however, of particular economical importance when using rubber as the main constituent. The improvement of the rubber which is brought about by the incorporation of even small proportions of an oil-soluble heat hardening condensation product and its reaction is very noticeable as to toughness, resistance to tearing and against abrasion as well as against chemical attacks.

The hardening reaction which is accompanied by the evolution of steam, should be carried out under pressure in order to avoid the formation of bubbles or caves in the mass. It is also advisable to carry on the reaction of the blend at relatively low temperatures (say about 120° C.) to a certain degree at ordinary pressure, whereupon the blown up mass is kneaded once more. After this procedure the reaction is carried out at higher temperatures (160°–180° C.) with the application of pressure. The hardening reaction may be accelerated, e. g. by adding strong acids.

My process may also be modified by simultaneously employing vulcanizing agents of known nature such as sulfur, sulfur chloride, with or without addition of vulcanization accelerating or retarding agents. But I wish to mention that such vulcanizing chemicals are not necessary, since my process not only brings about the effects described above, but apparently also acts on the rubber in a way equivalent to usual vulcanization according to known methods.

My process may further be advantageously employed with respect to reclaimed rubber obtained according to any known method from scrap or old rubber. By blending and reacting heat hardening oil-soluble condensation products with reclaimed rubber considerably more elastic and resisting masses can be obtained as compared with products obtained therefrom according to known methods.

A way of incorporating a heat hardening oil-soluble condensation product consists e. g. in forming a solution of the reclaimed rubber in a high boiling solvent, with or without the addition of softening or filling agents and in adding the condensation product. On heating the solution the reaction of the condensation product takes place accompanied by substantial thickening. The destructive action of the usual reclaiming process is thus compensated by the increase of the molecular size due to the condensation reaction. Such a product is distinguished by particularly high resistance against acids and alkalies and therefore can be suitably employed as lining for acidproof apparatus and containers.

Also other depolymerization products of rubber can be brought into reaction with those heat hardening condensation products. By polymerizing the reaction product obtained, according to known methods, rubbery masses of particular toughness and resistance are obtained.

My process, of course, may also be applied with respect to synthetic rubber. Also monomeric or polymeric starting materials or intermediates such as derive from butadiene and its homologues and which are employed in the production of synthetic rubber may be subjected to the process within the spirit of the invention whereupon the reaction product may or may not be polymerized according to methods known per se.

I have found that my process is applicable also with respect to rubber which has been physically or chemically altered in another way than mentioned above. Thus e. g. vulcanized rubber may be ground and thoroughly mixed with the condensation product, in a given case with the addition of a small quantity of a solvent. When using a solid condensation product a dry powder is obtained which can be hardened under pressure in suitable molds at a temperature from 150°–170° C.

When carrying out my process all known additional materials used in the rubber industry may be employed. These materials comprise all anorganic and organic filling or price lowering substances such as chalk, baryte, asbestos, resinous and bituminous stuffs; softening (plasticizing) agents such as mineral oils, fatty oils, factice etc.; pigments and dyes such as gold sulphide, zinc oxyde etc.; stuffs which increase hardness and elasticity such as gas black or colloidal clay; stuffs which accelerate or retard common vulcanization and stuffs which reduce natural aging.

Another useful employment of my invention lies in the varnish field. A solution of a blend of natural or synthetic rubber and a phenolic resin compatible therewith can be used as valuable quick drying varnish. When employing a heat hardening condensation product the film should be exposed to elevated temperatures (say about 150° C. or higher) after evaporating the solvent, hardening taking place thereby. Also in this case filling and softening materials, particularly drying oils, pigments etc., such as mentioned above, may be coemployed. Such varnishes are particularly valuable if acid and alkali-proof coatings are aimed at. Compositions obtained from relatively large proportions of the heat hardening condensation product are preferred in this case.

The products obtained according to my invention may be used for the most various purposes. In addition to the particular uses as coating compositions and molding plastics mentioned already hereinbefore they may also be employed as coating and impregnating agents for cloth, paper, all kind of porous materials and the like; as adhesives, cements and binding agents e. g. in the manufacture of laminated sheet and similar purposes.

A few examples may illustrate my invention. I wish to be understood that they are of illustrative nature only and are not to be considered by way of limitation. Of course the examples may be varied widely.

EXAMPLES

*Example 1*

100 parts of rubber are masticated for 30 minutes together with 20 parts of a heat hardening oil soluble condensation product obtained from equal parts of p-tert. butyl phenol and formaldehyde (40% by vol.) with the aid of a strong alkali and subsequent neutralization. At the same time 3 parts of gas black and 30 parts of clay are kneaded into the mass at 180° C. for 1½ hours under the application of pressure, a soft rubbery mass is obtained showing particular toughness and resistance to tearing and to abrasion as well as to chemical attacks.

The proportion of the condensation product may be varied widely. It may also be replaced by an equivalent condensation product obtained from formaldehyde and ortho-butyl phenol or thymol or an amyl phenol or any analogous higher molecular phenol having an open chain or branched chain or cyclic aliphatic radical as substituent in ortho or para position to the phenolic hydroxy group.

*Example 2*

90 parts of reclaimed rubber are treated with the application of heat with a high boiling solvent until a low viscous dispersion is obtained. 10 parts of a condensation product obtained with the aid of caustic alkali from p-isopropyl phenol and formaldehyde in excess over the equimolecular quantity, are added and dissolved.

After evaporating the solvent and subjecting the blend under pressure to a heat treatment at about 170° C. a hard elastic rubbery mass of particular resistance to abrasion and to tearing is obtained. The tensile strength of the mass is about 700 lbs. per square inch; in comparison thereto the same reclaimed rubber vulcanized with sulfur in a known manner shows a tensile strength of only about 450 lbs. per square inch.

The condensation product may be replaced by an equivalent one obtained e. g. from p-dimethyl-phenyl-methyl phenol (p-cumyl phenol) or any analogous phenol having a still higher number of aliphatic carbon atoms.

The solution of the blend as obtained according to the method described in this example may also serve as stove drying varnish or for adhesive or binding purposes and the like.

*Example 3*

30 parts of reclaimed rubber and 10 parts of rosin oil are thoroughly kneaded with 60 parts of a heat hardening oil soluble condensation product. The latter is obtained by means of a strong alkali from formaldehyde and a polynuclear phenol formed from interacting o-cresol with butyraldehyde or a higher molecular homologue.

The blend may serve as base for molded articles e. g. for insulating purposes. The hardening is suitably carried out at about 170° C. or higher.

Example 4

2 parts of vulcanized scrap rubber is finely ground and thoroughly mixed with 1 part of a powdered heat hardening oil soluble condensation product. This is obtained by condensing with formaldehyde the mixture of an alkyl phenol and an interaction product of phenol and dipentene hydrochlorides e. g. according to Example 6 of application Serial No. 30,152, now Patent No. 2,123,898 dated July 19, 1938.

The dry blend which yields very hard and elastic masses when heated at about 170° C. with the application of pressure may serve for the manufacture of molded articles for most various purposes.

In the following claims the term rubber is intended to comprise natural rubber as well as equivalent synthetic rubber, reclaimed rubber and vulcanized rubber.

What I claim is:

1. A process of producing a homogeneous reaction product which comprises blending rubber with a heat hardening phenolic condensation product which is compatible with drying oils and which is obtained by the aid of a strong alkali from (1) a phenol having only two particularly reaction favorable positions in the molecule unoccupied and at least three saturated carbon atoms per each phenolic group and (2) formaldehyde in excess over the equimolecular quantity, and reacting the blend of the rubber and the phenolic condensation product by the application of heat.

2. A process of producing a homogeneous reaction product which comprises blending a major proportion of rubber with a minor quantity of a heat hardening phenolic condensation product which is compatible with drying oils and which is obtained by the aid of a strong alkali from (1) a phenol having only two particularly reaction favorable positions in the molecule unoccupied and at least three saturated carbon atoms per each phenolic group and (2) formaldehyde in excess over the equimolecular quantity, and reacting the blend of the rubber and the phenolic condensation product by the application of heat.

3. A process as set forth in claim 1, wherein the blend of rubber and phenolic condensation product is heated at temperatures above 120° C.

4. A process as set forth in claim 1, wherein the blend is heated to a reaction temperature within the range of 160°–180° C.

5. A homogeneous reaction product produced according to claim 1, characterized by increased resistance to mechanical and chemical influences as compared with the reacting components.

6. A homogeneous reaction product produced according to claim 2, characterized by increased toughness, resistance to tearing and abrasion, and resistance to chemical attack, as compared with the original rubber.

FRITZ BITTERICH.